United States Patent
Siegel

(10) Patent No.: US 6,739,056 B2
(45) Date of Patent: May 25, 2004

(54) NUT PIERCER

(76) Inventor: Sharon Siegel, 18 Kuppernan La., Monsey, NY (US) 10952

( * ) Notice: Subject to any disclaimer, the term of this patent is extended or adjusted under 35 U.S.C. 154(b) by 0 days.

(21) Appl. No.: 10/147,605

(22) Filed: May 20, 2002

(65) Prior Publication Data

US 2003/0213131 A1 Nov. 20, 2003

(51) Int. Cl.⁷ .................................................. A47J 43/26
(52) U.S. Cl. ...................................... 30/120.3; 30/120.2
(58) Field of Search ................................ 30/114, 113.2, 30/120.1, 120.2, 120.3, 120.4, 120.5, 124, 134, 278, 310

(56) References Cited

U.S. PATENT DOCUMENTS

| | | | | | |
|---|---|---|---|---|---|
| 1,710,629 A | * | 4/1929 | Lindsey | ...................... | 30/120.3 |
| 1,762,031 A | * | 6/1930 | Roberts | ...................... | 30/278 |
| 2,700,994 A | * | 2/1955 | Welfel | ...................... | 30/120.3 |
| 2,804,111 A | * | 8/1957 | Burchett | ...................... | 30/120.3 |
| 3,048,208 A | * | 8/1962 | Umanoff | ...................... | 30/120.3 |
| 5,052,107 A | * | 10/1991 | Hirzel | ...................... | 30/120.3 |
| 5,533,265 A | * | 7/1996 | Samuelson | ...................... | 30/120.2 |
| 5,634,272 A | * | 6/1997 | Samuelson | ...................... | 30/120.3 |
| 2,799,310 A | * | 7/1997 | Jacobs | ...................... | 30/120.3 |

* cited by examiner

*Primary Examiner*—Boyer D. Ashley
(74) *Attorney, Agent, or Firm*—Ezra Sutton

(57) ABSTRACT

A device for piercing a nut comprising a first member having a receptacle for receiving the nut and a first handle section. A second member is also provided having a handle section and a cover section for the receptacle. The cover section has an opening formed therein. A third member is provided having a handle section shorter than the first and second handle sections and a piercing device for extending through the opening and into the receptacle for piercing the nut. The first, second, and third members have a common hinge point for pivoting the second and third members relative to the first member to pierce the nut in the receptacle. The first and second handle sections cooperate to form a gripping handle for the user to grip while pivoting the third member and piercing device to safely pierce the nut.

8 Claims, 5 Drawing Sheets

NUT PIERCER

FIELD OF INVENTION

The present invention relates to an improved nut piercer having a receptacle for receiving nuts. The nut is placed in the receptacle and is set in place by pressing a movable cover member downwardly, and subsequently piercing the nut by pressing the cutting blade downwardly through an opening in the cover member. The cutting blade is removed from the nut by pulling the movable member upward.

BACKGROUND OF THE INVENTION

Most nutcrackers lack the ability to pierce nuts in preparation for roasting. Also, it is often difficult and dangerous to attempt to manually pierce the hard shell of certain nuts, such as chestnuts, with a knife. Thus, there is a need for a safe and efficient device to pierce nuts in preparation for roasting.

It is an object of the present invention to provide an efficient and safe nut piercer that can be used to easily set a nut in place and pierce it at a regulated depth of penetration.

DESCRIPTION OF PRIOR ART

U.S. Pat. No. 5,634,272 issued to Samuelson shows the use of a spring and a retractable element for removing the piercing element or cutter from the nut after piercing.

SUMMARY OF THE INVENTION

The present invention provides an improved nut piercer comprising a first member having a receptacle for receiving a nut and a first handle section. A second member is provided which has a handle section and a cover section for the receptacle in which the cover has an opening in order to hold the nut in place for easy removal of the blade. A third member is also provided which has a piercing device or blade for extending through the opening of the second member and into the receptacle for piercing the nut. The aforementioned third member also has a handle section which is shorter than the first and second handle sections. The first, second, and third members have a common hinge point for pivoting the second and third members relative to the first member in order to pierce the nut in the receptacle. The first and second handle sections cooperate to form a handle for the user to grip while pivoting the third member and piercing device to pierce the nut.

In an alternate embodiment, the third handle section is at an angle relative to the first and second handle sections.

DETAILED DESCRIPTION OF THE PREFERRED EMBODIMENTS

Figure 1:
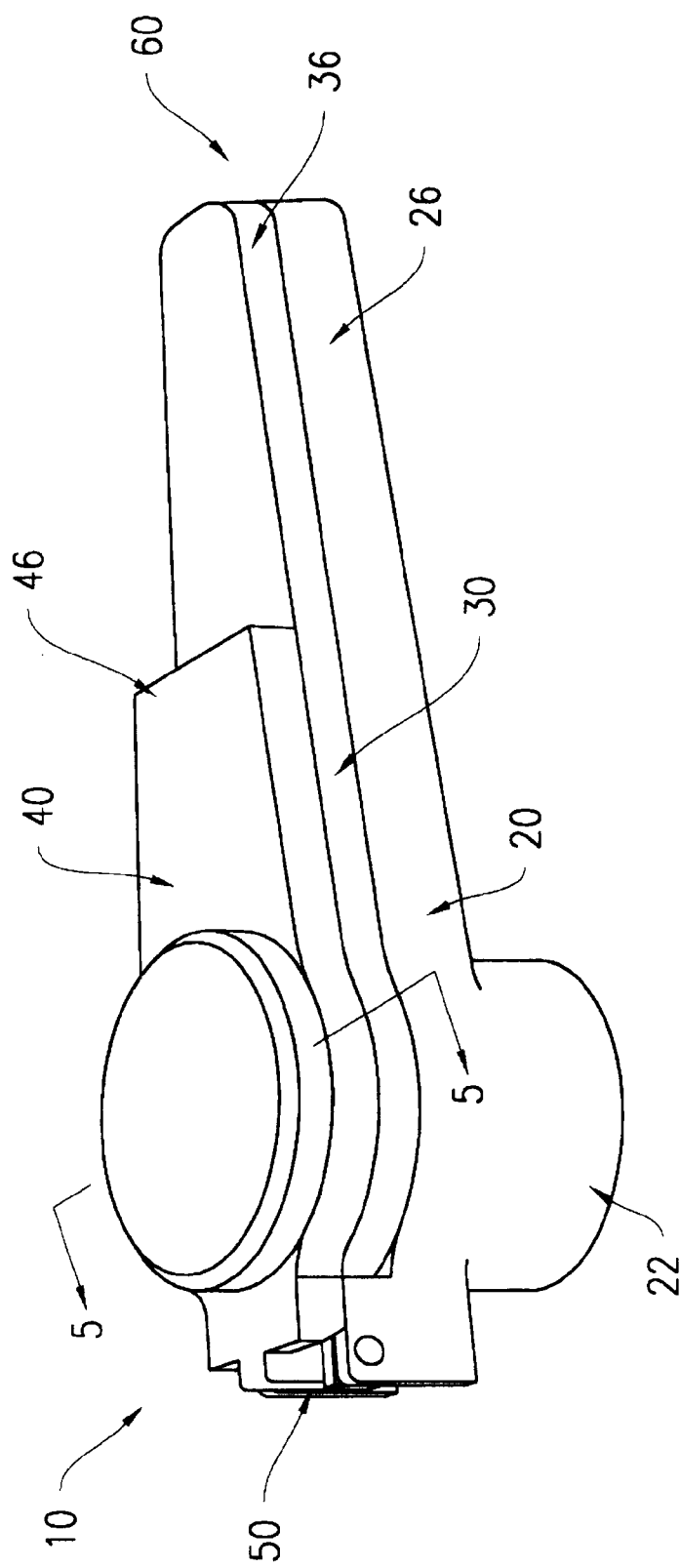
FIG. 1 is a perspective view of an improved nut piercer in the closed position.
Figure 2:
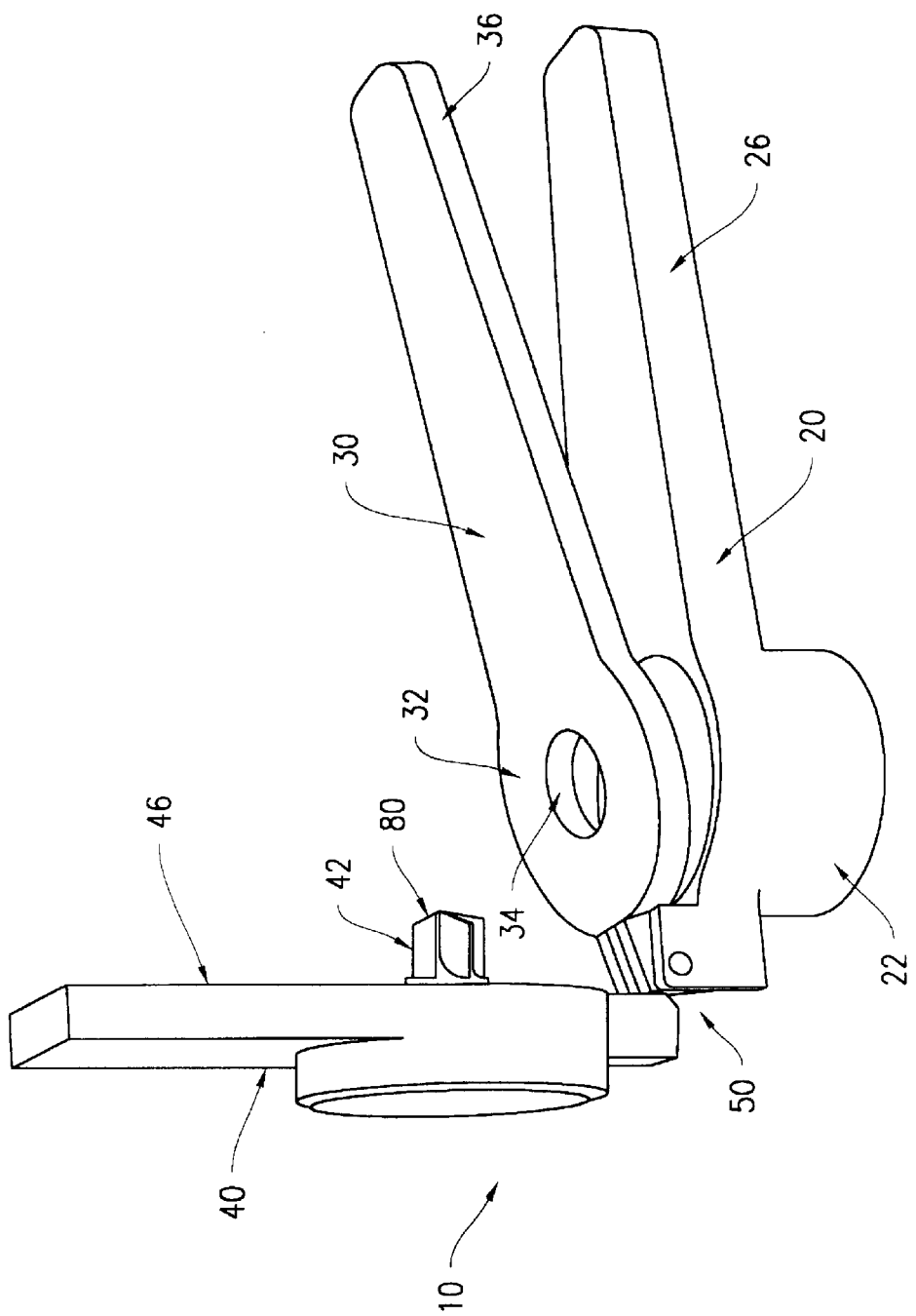
FIG. 2 is a perspective view of an improved nut piercer with the first and second members in the open position with respect to the first member.
Figure 3:
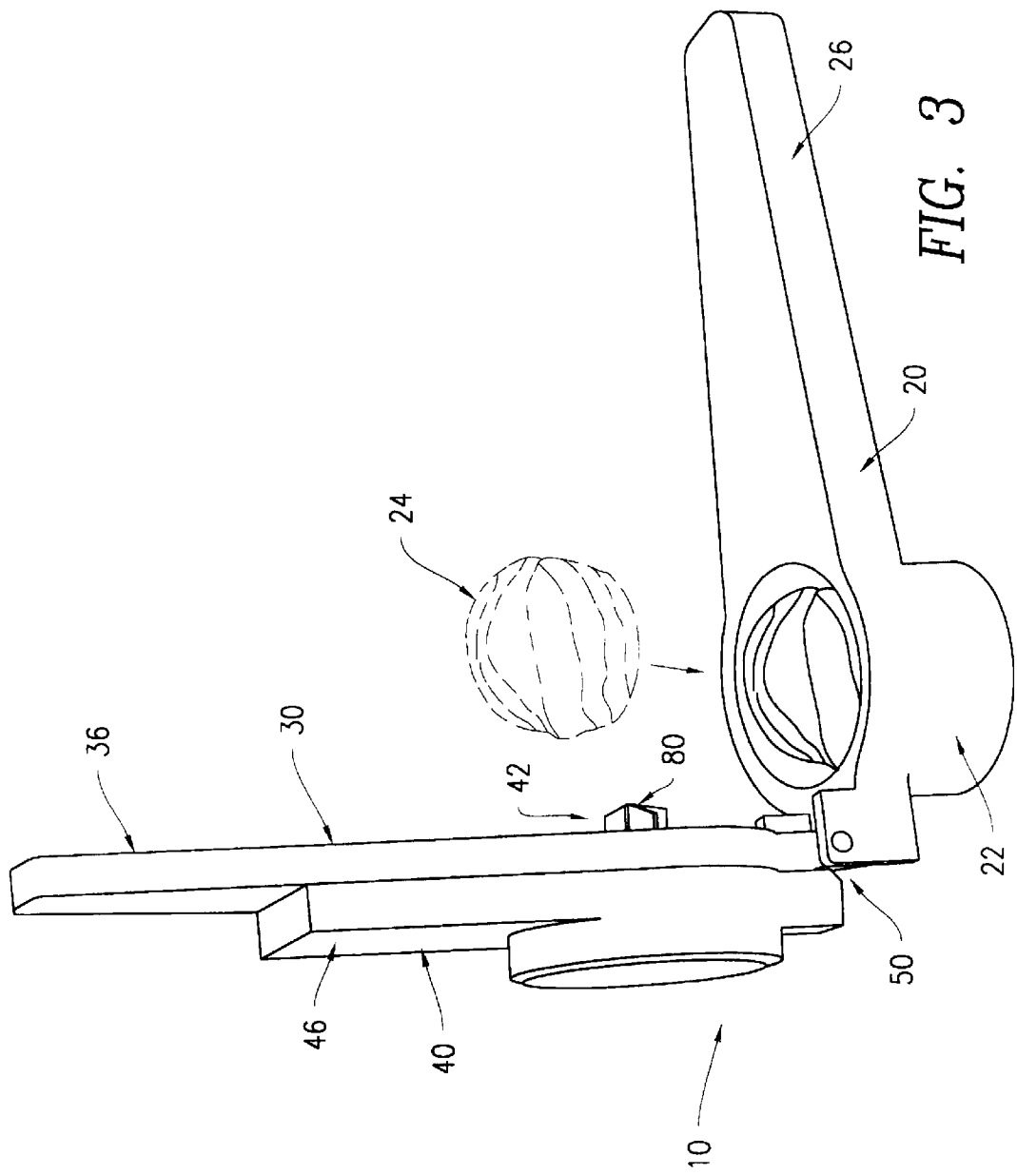
FIG. 3 is a perspective view of an improved nut piercer where the second and third members are coupled and pivotally extended away from the first member.
Figure 4:
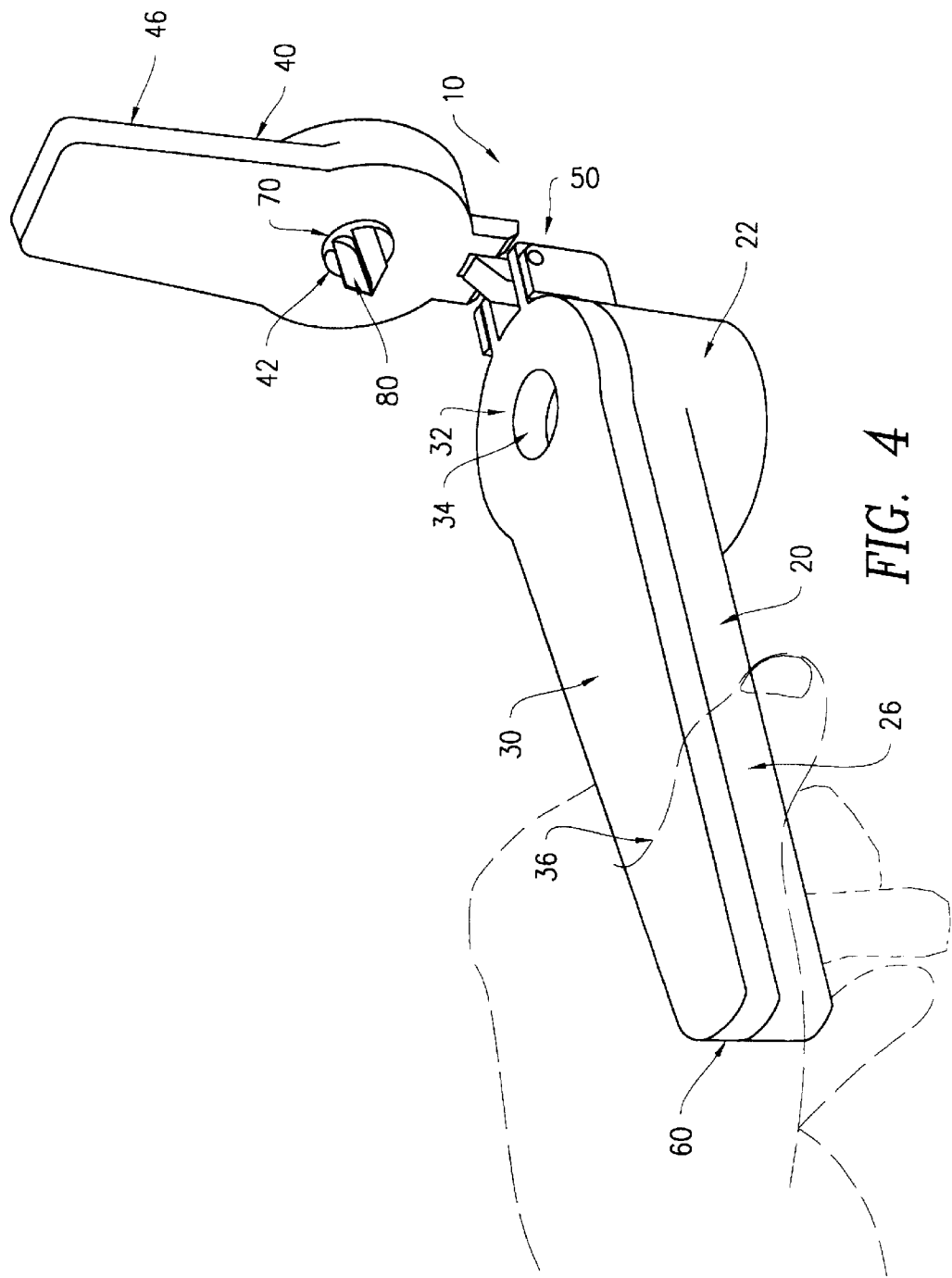
FIG. 4 is a perspective view of an improved nut piercer where the first and second members are coupled and gripped while the third member is pivotally extended away from the first member.

FIGS. 1, 2, 3 and 4 show an improved device 10 for piercing a nut 24 comprising a first member 20 having a receptacle 22 for receiving the nut 24 and a first handle section 26. A second member 30 is provided having a cover section 32 for the receptacle 22 and a second handle section 36. The cover section 32 has an opening 34 formed therein. A third member 40 is also provided which has a piercing device 42 for extending through the opening 34 and into the receptacle 22 for piercing the nut 24. The third member 40 also has a third handle section 46 which is shorter than the first and second handle sections 26, 26.

The first, second, and third members 20, 30 and 40 have a common hinge point 50 for pivoting the third member 40 and the piercing device 42 relative to the first and second members 20, 30 in order to pierce the nut 24 in the receptacle 22. The cover section 32 operates to hold the nut 24 in place while the piercing device 42 is removed from the nut 24. This is accomplished by the first and second handle sections 26, 36 cooperating to form a handle 60 for the user to grip safely while pivoting the third member 40 and integral piercing device 42 to the closed position to pierce the nut 24.

The third member 40 has a socket 70 for removably receiving the piercing device 42. The piercing device 42 is a blade 80 in the shape of a cruciform which can be removably inserted into the socket 70. In addition, blade 80 easily passes through opening 34 to pierce the nut while it is held in place by cover section 32.

The first and second handle sections 26, 36 each have a length of at least three (3) inches while the third handle section 46 has a length of at least one (1) inch. The difference between these two lengths defines the length of the gripping handle 60.

Figures 5, 6:
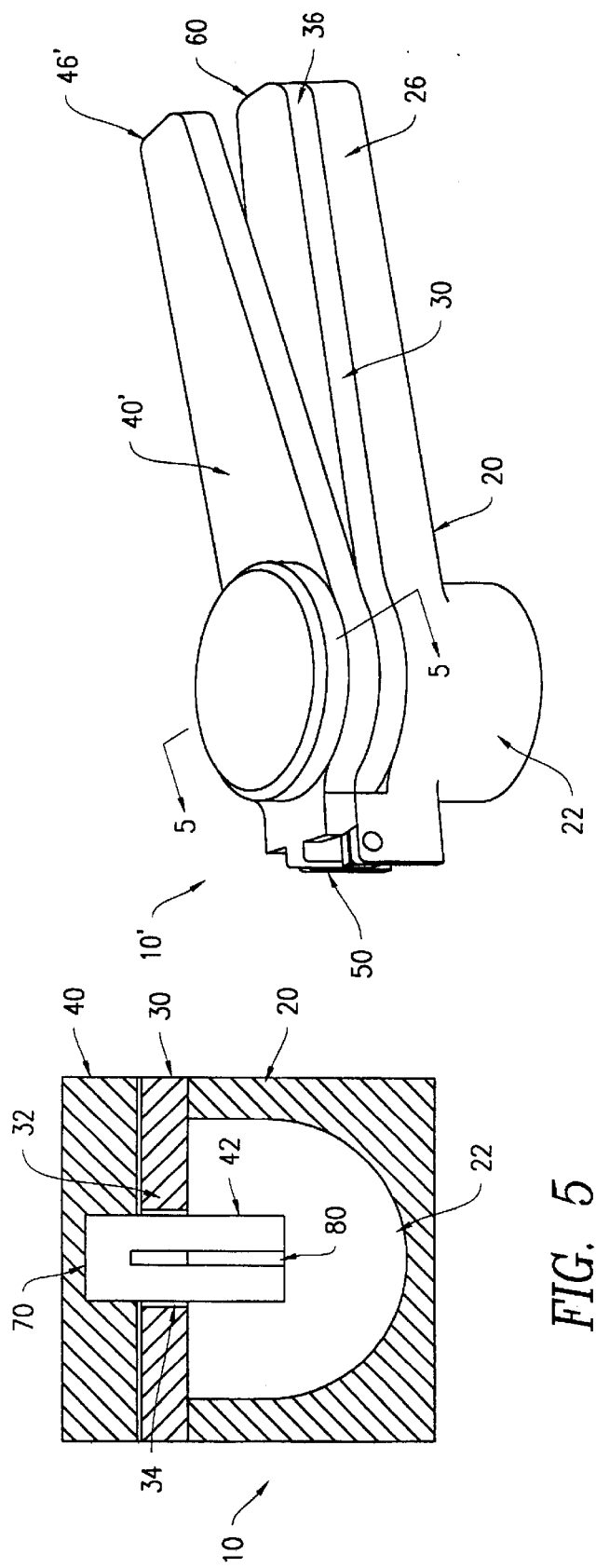
FIG. 5 is a cross-sectional view of the first, second and third members in the closed position at the receptacle end of the device.
FIG. 6 is a perspective view of an alternate embodiment of an improved nut piercer wherein the third handle section is at an angle to the first and second handle sections.

FIG. 5 shows a cross section of device 10 at the receptacle 22 end in which the first, second and third members 20, 30 and 40 are in the closed position.

FIG. 6 shows an alternate embodiment of an improved device 10' for piercing nuts wherein the third handle section 46' of the third member 40' is at an angle of between 15° to 45° to the first and second handle sections 26 and 36.

OPERATION

The device 10 provides for an improved nut piercer and is operated by placing a nut 24 in the receptacle 22 of the first member 20. The second member 30 is then moved downwardly to cover and hold the nut in place while the piercing device 42 pierces the nut 24. The cover section 32 operates to hold the nut 24 in place while the piercing device 42 is removed from the nut. The handle sections 26 and 36 of the first and second members 20, 30 combine to form a single handle grip 60 which is safely gripped by the user. The third member 40 or 40' and the integral cutting device 42 are then moved downwardly to pierce the nut 24.

ADVANTAGES OF THE PRESENT INVENTION

An advantage of the present invention is that it provides an efficient and safe nut piercer that is used to easily set a nut in place and to pierce it safely at a regulated depth of penetration.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A device for piercing a nut, comprising:
   a) a first member having a receptacle for receiving the nut and a first handle section;
   b) a second member having a cover section for said receptacle, said cover section having an opening formed therein, said second member further including a second handle section;
   c) a third member having a piercing device for extending through said opening and into said receptacle for piercing the nut, said third member having a third handle section shorter than said first and second handle sections;
   d) said first, second, and third members having a common hinge point for pivoting said third member and said piercing device relative to said first and second members to pierce the nut in said receptacle; said cover section operating to hold the nut in place while said piercing device is removed from the nut and said opening in said cover section; and
   e) said first and second handle sections cooperating to form a gripping handle for the user to grip while pivoting said third member and said piercing device to pierce the nut.

2. A device according to claim 1, wherein said third member has a socket for removably receiving said piercing device.

3. A device according to claim 2, wherein said piercing device is a blade in the shape of a cruciform and which can be removably inserted in said socket.

4. A device according to claim 1, wherein said piercing device is removable from said third member for replacing said piercing device.

5. A device according to claim 1, wherein said first and second handle sections each have a length of at least three (3) inches.

6. A device according to claim 5, wherein said third handle section has a length of at least one (1) inch.

7. A device according to claim 6, wherein the difference in length between said third handle section and said first and second handle sections defines the length of said gripping handle.

8. A device for piercing a nut, comprising:
   a) a first member having a receptacle for receiving the nut and a first handle section;
   b) a second member having a cover section for said receptacle, said cover section having an opening formed therein, said second member further including a second handle section;
   c) a third member having a piercing device for extending through said opening and into said receptacle for piercing the nut, said third member having a third handle section at an angle relative to said first and second handle sections;
   d) said first, second, and third members having a common hinge point for pivoting said third member and said piercing device relative to said first and second members to pierce the nut in said receptacle; said cover section operating to hold the nut in place while said piercing device is removed from the nut and said opening in said cover section; and
   e) said first and second handle sections cooperating to form a gripping handle for the user to grip while pivoting said third member and said piercing device to pierce the nut.

* * * * *